United States Patent
Jheng et al.

(10) Patent No.: US 8,995,989 B2
(45) Date of Patent: Mar. 31, 2015

(54) UE ENHANCEMENT FOR SERVICE RECOVERY IN MOBILE COMMUNICATIONS NETWORK

(71) Applicant: Mediatek, Inc., Hsin-Chu (TW)

(72) Inventors: Yu-Syuan Jheng, Taipei (TW); Hung-Lin Chang, Taipei (TW)

(73) Assignee: Mediatek Inc. (TW)

( * ) Notice: Subject to any disclaimer, the term of this patent is extended or adjusted under 35 U.S.C. 154(b) by 30 days.

(21) Appl. No.: 13/898,911

(22) Filed: May 21, 2013

(65) Prior Publication Data

US 2013/0316699 A1 Nov. 28, 2013

Related U.S. Application Data

(60) Provisional application No. 61/650,227, filed on May 22, 2012.

(51) Int. Cl.
*H04W 48/18* (2009.01)
*H04W 48/02* (2009.01)

(52) U.S. Cl.
CPC .............. *H04W 48/18* (2013.01); *H04W 48/02* (2013.01)
USPC ......................................... 455/423; 455/411

(58) Field of Classification Search
USPC ........................ 455/410, 411, 423, 432.1, 434
See application file for complete search history.

(56) References Cited

U.S. PATENT DOCUMENTS

| | | | |
|---|---|---|---|
| 2005/0227719 A1 | 10/2005 | Gunaratnam et al. | 455/510 |
| 2007/0287419 A1 | 12/2007 | Wang | 455/411 |
| 2010/0203865 A1* | 8/2010 | Horn et al. | 455/411 |
| 2012/0135709 A1 | 5/2012 | Deng et al. | 455/411 |

FOREIGN PATENT DOCUMENTS

| | | |
|---|---|---|
| CN | 1832615 A | 3/2005 |
| CN | 101998542 A | 8/2009 |
| WO | WO2005048630 A1 | 11/2003 |

OTHER PUBLICATIONS

3GPP TS 22.011 V9.4.0 (Jun. 2010), $3^{rd}$ Generation Partnership Project, "Technical Specification Group Services and System Aspects", Service Accessibility (release 9).
International Search Report and Written Opinion of International Search Authority for PCT/CN2013/076042 dated Aug. 29, 2013(11 pages).

* cited by examiner

*Primary Examiner* — Sam Bhattacharya
(74) *Attorney, Agent, or Firm* — Zheng Jin; Helen Mao (57) ABSTRACT

A method of applying a network forbidden list for enhanced service recovery in mobile communication networks is provided. In a first embodiment, upon receiving an error cause for a RAT in a selected network, a UE stores a PLMN ID, the RAT information, and the error cause as an entry in the forbidden list. The UE will not select to the RAT of the network stored in the forbidden list until the PLMN/RAT entry is removed from the forbidden list. In a second embodiment, upon receiving an error cause in a selected network, a UE stores a PLMN ID, the error cause, and a timer value as an entry in the forbidden list. The UE will not select to the network stored in the forbidden list until the timer associated with the PLMN ID is expired.

21 Claims, 5 Drawing Sheets

| INDEX | PLMN ID | RAT | ERROR CODE |
|---|---|---|---|
| 1 | PLMN #1 | RAT #1 | ERROR CAUSE #1 |
| 2 | PLMN #1 | RAT #2 | ERROR CAUSE #2 |
| ⋮ | ⋮ | ⋮ | ⋮ |
| MAX-ENTRY | PLMN #N | RAT #T | ERROR CAUSE #C |

| INDEX | PLMN ID | ERROR CODE | TIMER VALUE |
|---|---|---|---|
| 1 | PLMN #1 | ERROR CAUSE #1 | TIMER #1 |
| 2 | PLMN #2 | ERROR CAUSE #2 | TIMER #2 |
| ⋮ | ⋮ | ⋮ | ⋮ |
| MAX-ENTRY | PLMN #N | ERROR CAUSE #C | TIMER #T |

UE ENHANCEMENT FOR SERVICE RECOVERY IN MOBILE COMMUNICATIONS NETWORK

CROSS REFERENCE TO RELATED APPLICATIONS

This application claims priority under 35 U.S.C. §119 from U.S. Provisional Application No. 61/650,227, entitled "UE Enhancement of Service Recovery," filed on May 22, 2012, the subject matter of which is incorporated herein by reference.

TECHNICAL FIELD

The disclosed embodiments relate generally to mobile communication networks, and, more particularly, to UE enhancement for service recovery.

BACKGROUND

A Public Land Mobile Network (PLMN) is a network established and operated by an administration or recognized operating agency (ROA) for the specific purpose of providing land mobile communication services to the public. PLMN provides communication possibilities for mobile users. A PLMN may provide service in one or a combination of frequency bands. A relationship exists between each subscriber and his home PLMN (HPLMN). If communications are handled over another PLMN, this PLMN is referred to as the visited PLMN (VPLMN). A PLMN area is the geographical area in which a PLMN provides communication services according to the specifications to mobile users. In the PLMN area, the mobile users can set up calls to other users of a terminating network. The terminating network may be a fixed network, the same PLMN, another PLMN or other types of PLMN. Terminating network users can also setup calls to the PLMN. The PLMN area is allocated to a PLMN, which is determined by the service provider.

data and internet access. Access to PLMN services is achieved by means of an air interface involving radio communications between mobile phones and base stations with integrated IP network services. One PLMN may include multiple radio access networks (RAN) utilizing different radio access technologies (RAT) for accessing mobile services. A radio access network is part of a mobile communication system, which implements a radio access technology. Conceptually, RAN resides between a mobile device and provides connection with its core network (CN). Depending on the standard, mobile phones and other wireless connected devices are varyingly known as user equipment (UE), terminal equipment, mobile stations (MS), etc. Examples of different RATs include GERAN (GSM) radio access network, UTRAN (UMTS) radio access network, and E-UTRAN (LTE) radio access network.

When a mobile device is turned on, a network selection process starts, whereby candidate PLMNs are chosen, one at a time, for attempted registration. In GSM networks, when an MS is switched on, the International Mobile Subscriber Identity (IMSI) attach procedure is executed. The ISMI attach procedure is required for the MSC and VLR to register the MS in the network. Similarly, in UMTS and LTE networks, when a UE is switched on, it searches for a mobile network to connect. Once the UE selects its desired network, it will try to attach to the network and attempts registration with the network. Typically, UE supports both manual and automatic network selection mechanisms.

To facilitate the network selection process, a UE may have an Operator Controlled PLMN Selector list and a User Controlled PLMN Selector list stored on the SIM/USIM card. Both PLMN Selector lists may contain a list of preferred PLMNs in priority order. A PLMN Selector list, including HPLMN, may have multiple occurrences, with different radio access technology identifies, e.g., E-UTRAN, UTRAN, or GERAN. The UE may utilize all the information stored in the SIM/USIM related to network selection, e.g., HPLMN, Operator Controlled PLMN Selector list, User Controlled PLMN Selector list, and Forbidden PLMN list. If registration on a PLMN is successful, the UE indicates this PLMN ("the registered PLMN") and be capable of making and receiving calls on it. However, if registration is unsuccessful because the IMSI is unknown in the home network or the UE is illegal, then the UE does not allow any future registration attempts, until the UE is next powered-up or a SIM/USIM is inserted.

When a registration attempt by the UE is rejected by a network with an indication of "permanent" PLMN restriction, the PLMN identity is written to a list of "Forbidden PLMNs" stored in a data field in the SIM/USIM. If a successful registration is achieved on a PLMN in the Forbidden PLMN list, the PLMN is then deleted from the list. The Forbidden PLMN list is used to avoid unnecessary registration attempts. For example, some networks may suffer severe network errors that cannot be resolved in short term. Depending on the underlying cause of the error, it may make no sense to continue to try to attach or register to the network. In that case, continuing to try will wastefully consume UE power and use system resources when there is no chance of success. In addition, some errors occurred in one of the networks may not occur in another network. As a result, reattempt in the network that occurs severe network error will delay the initiation of other recovery mechanism that can successfully restore service to the user. A well-designed forbidden PLMN list is thus desirable.

SUMMARY

A method of applying a network forbidden list for enhanced service recovery in mobile communication networks is provided.

In a first embodiment, a forbidden PLMN/RAT list is utilized for enhanced network selection. Upon receiving an error cause in a selected network, a UE stores a PLMN ID, the RAT information, and the error cause as an entry in the forbidden PLMN/RAT list. The UE will not select to the RAT of the PLMN stored in the forbidden list until the PLMN/RAT entry is removed from the forbidden list. The forbidden PLMN/RAT list can be configured in SIM/USIM, or added or removed by UE when receiving specific network error cause associated with PLMN/RAT.

In a second embodiment, upon receiving an error cause in a selected network, a UE stores a PLMN ID, the error cause, and a timer value as an entry in the forbidden PLMN list. The UE will not select to the PLMN stored in the forbidden list until the timer associated with the PLMN ID is expired. The timer value may be decide by the network or by the UE based on the PLMN ID and the error cause. The timer value may be dynamically adjusted by a message received from the network, or by a predefined triggering event.

In one novel aspect, the timer-based network selection method may be applied without the use of a network forbidden list. When a UE attaches to a network and receives an error code, the UE simply starts a forbidden timer associated with the PLMN ID of the network. The UE refrains from attaching to the network until after expiry of the timer.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
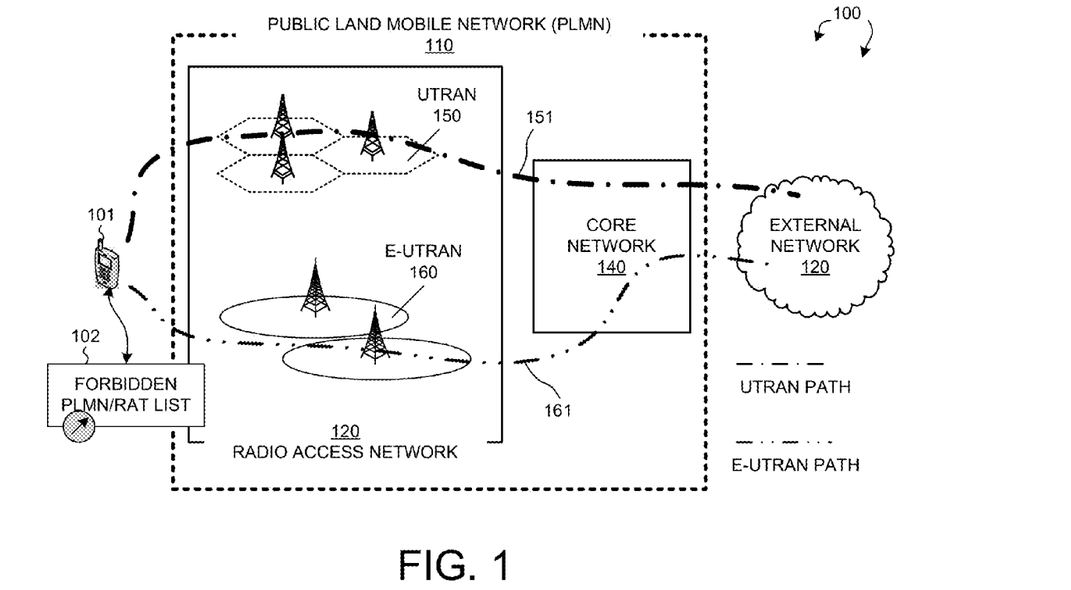
FIG. 1 schematically shows a Public Land Mobile Network (PLMN) having multiple radio access networks (RAN) in accordance with one novel aspect.

FIG. 1 schematically shows a Public Land Mobile Network (PLMN) 110 supporting multiple radio access technologies in accordance with one novel aspect. A mobile communications system 100 comprises PLMN 110 and an external network 120 (e.g., the Internet). PLMN 110 comprises a radio access network (RAN) 130 and a core network (CN) 140. RAN 130 further comprises a UMTS Terrestrial Radio Access Network (UTRAN) 150 supporting a first radio access technology (RAT)—Universal Mobile Telecommunications System (UMTS), and an Evolved UTRAN (E-UTRAN) 160 supporting a second radio access technology—3GPP Long-term Evolution (LTE). UTRAN 150 and E-UTRAN 160 share the same core network CN 140. PLMN 110 provides mobile services to mobile users such as UE 101. UE 101 may access PLMN 110 for mobile services via different radio access technologies.

When UE 101 is turned on, UE 101 selects its desired network. For example, UE 101 may select PLMN 110 if PLMN 110 is the home PLMN (HPLMN). UE 101 supports both manual and automatic network selection mechanisms. To facilitate the network selection process, a UE may have an Operator Controlled PLMN Selector list and a User Controlled PLMN Selector list stored on its subscriber identity module (SIM) or universal SIM (USIM) card. The SIM/USIM securely stores the international mobile security identity (IMSI) and other related keys used to identify and authenticate subscribers on mobile telephone devices. Both PLMN Selector lists may contain a list of preferred PLMNs in priority order. A PLMN Selector list, including HPLMN, may have multiple occurrences, with different radio access technology identifies, e.g., E-UTRAN, UTRAN.

After network selection, UE 101 will try to attach to the network and attempt registration with the network. For example, UE 101 tries to attach to and register with its home network PLMN 110 via E-UTRAN 160. If registration on PLMN 110 is successful, UE 101 indicates this PLMN ("the registered PLMN") and be capable of making and receiving calls on it. However, if registration is unsuccessful because the IMSI is unknown in the home network or the UE is illegal, then UE 101 does not allow any future registration attempts, until UE 101 is next powered-up or a SIM/USIM is inserted. UE 101 may utilize all the information stored in its SIM/USIM related to network selection, e.g., HPLMN, the Operator Controlled PLMN Selector list, the User Controlled PLMN Selector list, and a Forbidden PLMN list.

The Forbidden PLMN list is used to avoid unnecessary registration attempts. For example, some networks may suffer severe network errors that cannot be resolved in short term. Depending on the underlying cause of the error, it may make no sense to continue to try to attach or register to the network. In that case, continuing to try will wastefully consume UE power and use system resources when there is no chance of success. In addition, some errors occurred in one of the networks may not occur in another network. As a result, reattempt in the network that occurs severe network error will delay the initiation of other recovery mechanism that can successfully restore service to the user.

In the current art, the Forbidden PLMN list is only indexed by a PLMN ID. Such design, however, is not sufficient when the network error only occurs in a specific radio access technology. For example, the operator providing mobile services discovers that the newly deployed 4G LTE network (e.g., E-UTRAN 160) needs to have a relatively long down time due to an unexpected event. On the other hand, the existing UMTS network (e.g., UTRAN 150) sharing the same CN 140 is still capable of providing normal mobile services to its subscribers. If PLMN 110 is added to the Forbidden PLMN list, then mobile users will not be able to access the entire PLMN, not even through UTRAN 150. In one novel aspect, each entry in a novel Forbidden PLMN/RAT list 102 is not only associated with the PLMN ID, but also associated with a specific RAT such that better network selection decisions can be made. When E-UTRAN 160 is down and E-UTRAN path 161 is not available, UE 101 will still be able to access PLMN 110 via UTRAN 150 as depicted by UTRAN path 151. Furthermore, each entry in Forbidden PLMN/RAT list 102 may be timer-based to improve service recovery performance.

Figure 2:
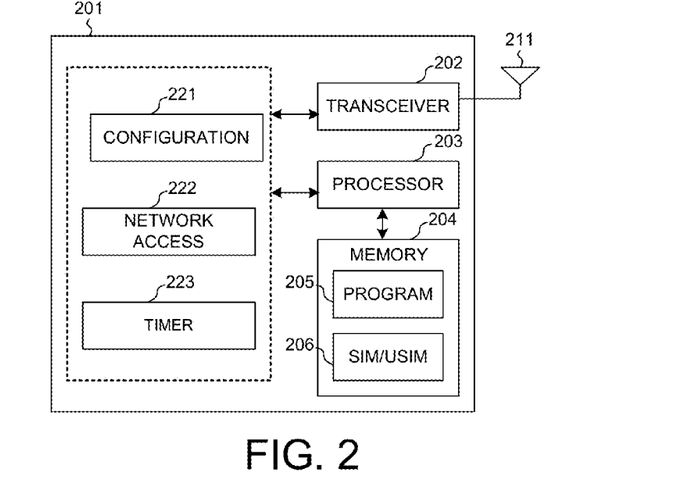
FIG. 2 is a simplified block diagram of a user equipment (UE) that supports embodiments of the present invention.

FIG. 2 is a simplified block diagram of a user equipment (UE) 201 that supports embodiments of the present invention. UE 201 has RF transceiver module 202, coupled with antenna 211, receives RF signals from antenna 211, converts them to baseband signals and sends them to processor 203. RF transceiver 202 also converts received baseband signals from the processor 203, converts them to RF signals, and sends out to antenna 211. Processor 203 processes the received baseband signals and invokes different functional modules to perform features in the UE. Memory 204 stores program instructions and data to control the operations of the UE.

FIG. 2 further illustrates three functional modules 221 to 223 in UE 201 that carry out embodiments of the current invention. The functional modules may be implemented by hardware, firmware, software, or any combination thereof. The function modules, when executed by processors 203 (e.g., via executing program codes 205), for example, allow UE 201 to properly select the desired network and attach to the selected network after successful registration. In one example, a configuration module 221 configures various information related to network selection and registration (e.g., a network forbidden list), a network access module 222 performs network selection and registration based on the configuration, and a timer module 223 implements various timers to be used for the network forbidden list. Note that the network selection and registration related information, such as HPLMN, Operator Controlled PLMN Selector list, User Controlled PLMN Selector list, and Forbidden PLMN/RAT list, may be stored in memory 204 (e.g., non-volatile RAM) or SIM/USIM 206 that is embedded into a removable card.

Figure 3:
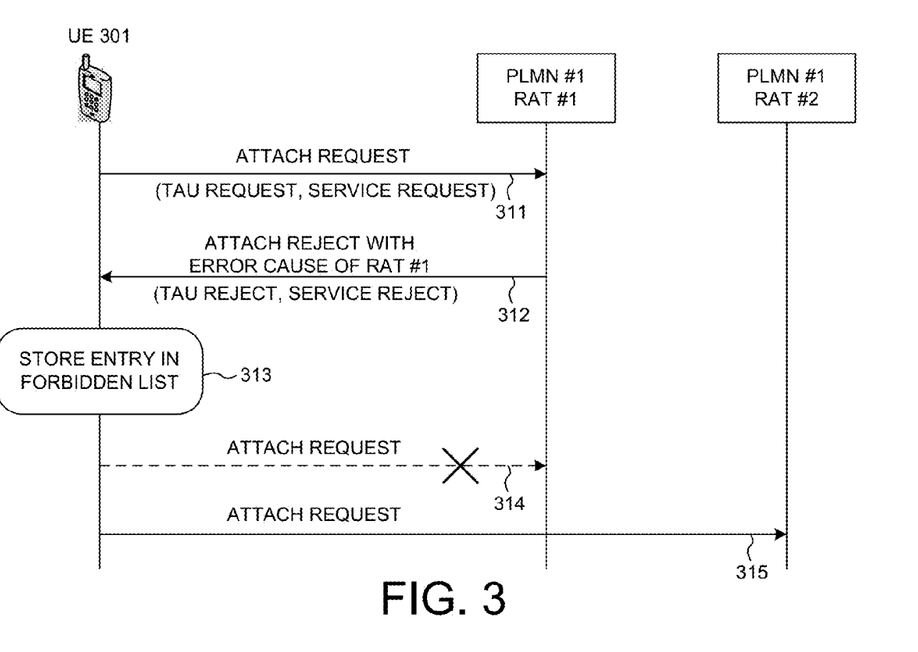
FIG. 3 illustrates a first embodiment of applying a network forbidden list for enhanced service recovery.

FIG. 3 illustrates a first embodiment of applying a network forbidden list for enhanced service recovery in a mobile communications system. The mobile communications system comprises UE 301 and PLMN #1 supporting both a first radio access technology RAT #1 and a second radio access technology RAT #2. In step 311, UE 301 selects PLMN #1 and tries to attach to PLMN #1 by sending an ATTACH Request message to the network using RAT #1. Due to a severe network failure occurred in RAT #1, the attachment is rejected by the network. In step 312, UE 301 receives an ATTACH Reject message with error cause of RAT #1 (e.g., In TS24.301, #42 (Severe network failure) is specific for LTE RAT). Upon receiving the ATTACH Reject message and the error cause, in step 313, UE 301 stores an entry to a network forbidden list, which is indexed by both the PLMN ID (e.g., PLMN #1) and the RAT ID (e.g., RAT #1). Once a PLMN/RAT is stored in the network forbidden list, the UE is no longer allowed to attach to the same PLMN/RAT until such entry is removed from the forbidden list (e.g., see 314). In step 315, UE 301 selects PLMN #1 again and tries to attach to PLMN #1 by sending an ATTACH Request to the network using RAT #2. Because RAT #2 is not stored in the forbidden list, UE 301 is allowed to access the same PLMN by using a different RAT. In some alternative examples, the UE receives the error cause from TAU REJECT message or SERVICE REJECT message when the UE tries Tracking Area Update Procedure or Service Procedure in the network. The UE behavior after receiving the error cause is similar to the steps illustrated in FIG. 3.

Figure 4:
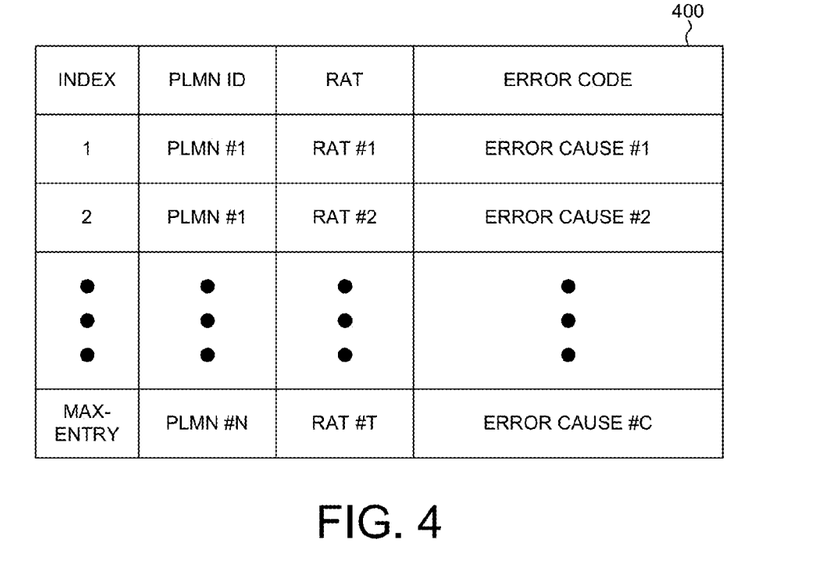
FIG. 4 illustrates an example of a forbidden PLMN/RAT list.

FIG. 4 illustrates one example of a Forbidden PLMN/RAT list. Table 400 illustrates an example of a Forbidden PLMN/RAT list. The Forbidden PLMN/RAT list has a number of entries, as indexed by an index number 1, 2 . . . MAX-ENTRY. Each entry is associated with a PLMN ID, a RAT ID, and an error code indicating an error cause. For example, the first entry stores PLMN #1 and RAT #1 with error code #1, the second entry stores PLMN #1 and RAT #2 with error code #2 . . . and so on so forth. The forbidden list can be configured in SIM/USIM/UE memory, or added by UE when receiving specific network error cause. When UE receives the specific network error cause from the network, UE stores the error cause and the PLMN with RAT information into the Forbidden PLMN/RAT list. The UE will not select to the same RAT of the same PLMN stored in the Forbidden PLMN/RAT list until the PLMN/RAT entry is removed from the Forbidden PLMN/RAT list. In one example, table 400 is implemented as a first-in first-out FIFO. The UE keeps adding new entries until the FIFO is full, and removes old entries after the FIFO is full.

Figure 5:
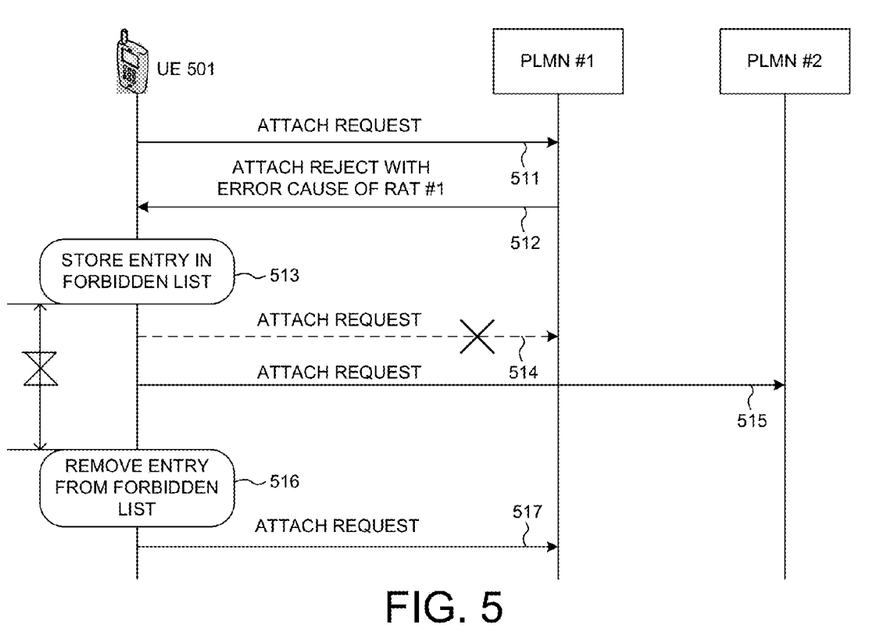
FIG. 5 illustrates a second embodiment of applying a network forbidden list for enhanced service recovery.

FIG. 5 illustrates a second embodiment of applying network forbidden list for enhanced service recovery in a mobile communications system. The mobile communications system comprises UE 501 and PLMN #1 and PLMN #2. In step 511, UE 501 selects PLMN #1 and tries to attach to PLMN #1 by sending an ATTACH Request message to the network. Due to a severe network failure occurred in PLMN #1, the attachment is rejected by the network. In step 512, UE 501 receives an ATTACH Reject message with error cause of PLMN #1 (e.g., In TS24.301, #42 (Severe network failure) is specific for LTE RAT). Upon receiving the ATTACH Reject message and the error cause, in step 513, UE 501 stores an entry to a network forbidden list, which is indexed by the PLMN ID (e.g., PLMN #1). Meanwhile, UE 501 also starts a timer associated with PLMN #1. Once a PLMN ID is stored in the network forbidden list, the UE is no longer allowed to attach to the same PLMN until such entry is removed from the forbidden list or until its timer expires (e.g., see 514). In step 515, UE 501 selects another network PLMN #2 and tries to attach to PLMN #2 by sending an ATTACH Request to the network. Because PLMN #2 is not stored in the network forbidden list, UE 501 is allowed to access to PLMN #2 for mobile services. Later, the timer associated with PLMN #1 expires, and UE 501 removes PLMN #1 from the network forbidden list in step 516. In step 517, UE 501 is able to select PLMN #1 again. In some alternative examples, the UE receives the error cause from TAU REJECT message or SERVICE REJECT message when the UE tries Tracking Area Update Procedure or Service Procedure in the network. The UE behavior after receiving the error cause is similar to the steps illustrated in FIG. 5.

Figure 6:
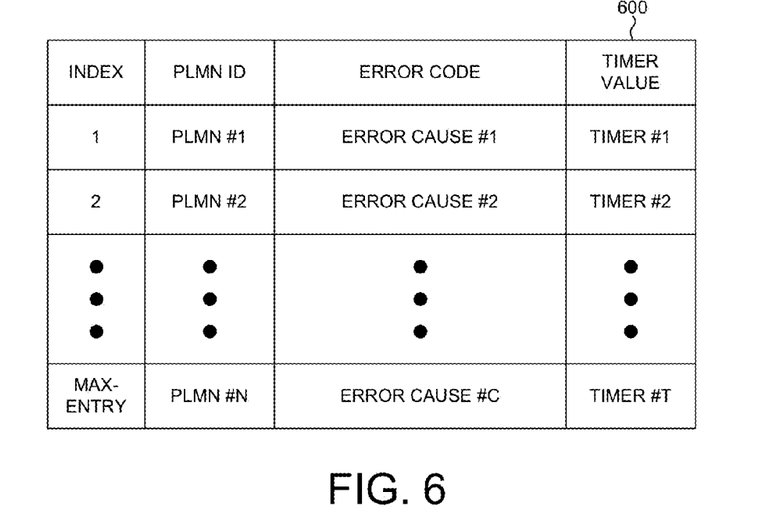
FIG. 6 illustrates an example of a timer-based forbidden PLMN list.

FIG. 6 illustrates one example of a timer-based Forbidden PLMN list. Table 600 illustrates an example of a timer-based Forbidden PLMN list. The timer-based Forbidden PLMN list has a number of entries, as indexed by an index number 1, 2 . . . MAX-ENTRY. Each entry is associated with a PLMN ID, an error code, and a timer value. For example, the first entry stores PLMN #1 with error code #1 and timer #1, the second entry stores PLMN #2 with error code #2 and timer #2 . . . and so on so forth. The forbidden list can be configured in SIM/USIM or added by UE when receiving specific network error cause. When UE receives the specific network error cause from the network, UE stores the error cause and the PLMN ID with timer information into the Forbidden PLMN list. The UE will not automatically select to the same PLMN stored in the Forbidden PLMN list until the PLMN entry is removed from the Forbidden PLMN list upon timer expiry.

The timer value may be configured in different ways. For example, the timer value may be decided by the network associated with a PLMN/RAT and the error code. On the other hand, the UE may determine the timer value itself based on the PLMN/RAT and the error code. For example, the UE interprets the error code and determine a longer timer value for a more severe network failure. The UE may retrieve the timer value from its SIM/USIM card. In one example, the UE derives the timer value based on information stored in the SIM/USIM card. In addition, the timer value may be dynamically adjusted by a message received from the network or by a predefined triggering event detected by the UE. The triggering event may be a manual selection of PLMN by the mobile user. The triggering event may also be a detected location change of the UE. By introducing a dynamically adjustable timer value for each PLMN entry in the network forbidden list, the network/UE is able to make effective and efficient decision on network selection and thus enhance service recovery performance.

Figure 7:
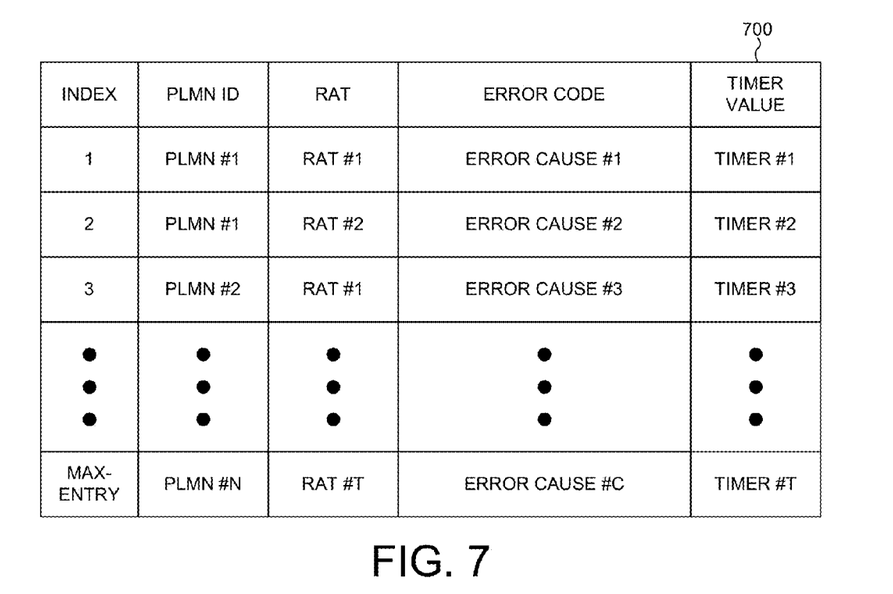
FIG. 7 illustrates an example of a timer-based forbidden PLMN/RAT list.

In one novel aspect, a timer-based Forbidden PLMN/RAT list may be used by combining the first embodiment and the second embodiment. FIG. 7 illustrates an example of a timer-based Forbidden PLMN/RAT list. As depicted by table 700, the timer-based Forbidden PLMN/RAT list has a number of entries, as indexed by an index number 1, 2 . . . MAX-ENTRY. Each entry is associated with a PLMN ID, a RAT ID, an error code, and a timer value. For example, the first entry stores PLMN #1 and RAT #1 with error code #1 and timer #1, the second entry stores PLMN #1 and RAT #2 with error code #2 and timer #2, the third entry stores PLMN #2 and RAT #1 with error code #3 and timer #3, . . . and so on so forth. The forbidden list can be configured in SIM/USIM or added by UE when receiving specific network error cause. When UE receives the specific network error cause from the network, UE stores the error cause, the PLMN ID, the RAT ID, with timer information into the forbidden PLMN/RAT list. The UE will not automatically select to the PLMN/RAT stored in the Forbidden PLMN/RAT list until the PLMN/RAT entry is removed from the forbidden PLMN/RAT list upon timer expiry. By combining the first and the second embodiments, each entry in the forbidden list is associated with a specific PLMN/RAT and a specific timer value. Thus, Network selection can be performed with more flexibility to enhance service recovery performance.

Figure 8:
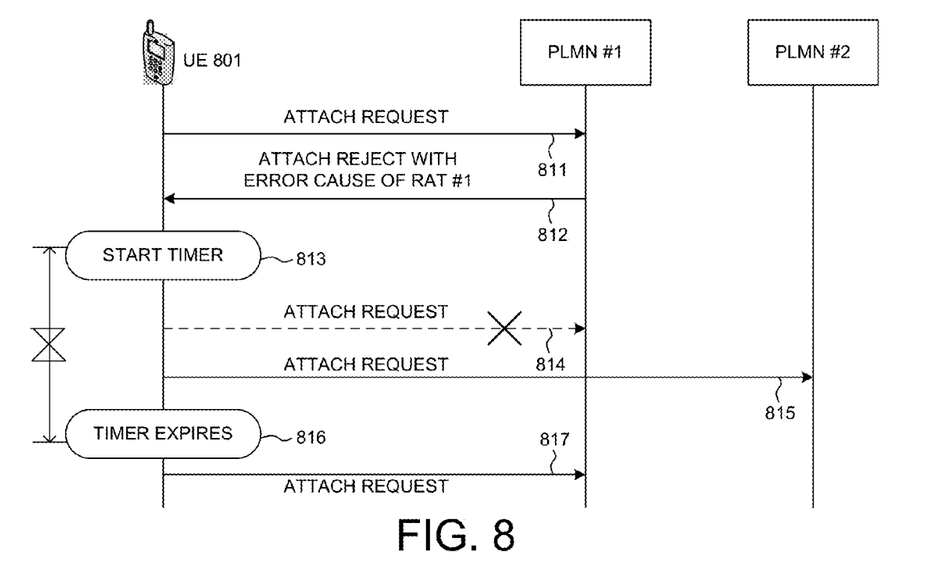
FIG. 8 illustrates one embodiment of a timer-based network selection method for enhanced service recovery.

In another novel aspect, the timer-based network selection mechanism may be applied without the use of a network forbidden list. FIG. 8 illustrates a timer-based network selection method for enhanced service recovery in a mobile communications system. The mobile communications system comprises UE 801 and PLMN #1 and PLMN #2. In step 811, UE 801 selects PLMN #1 and tries to attach to PLMN #1 by sending an ATTACH Request message to the network. Due to a severe network failure occurred in PLMN #1, the attachment is rejected by the network. In step 812, UE 801 receives an ATTACH Reject message with error cause of PLMN #1 (e.g., In TS24.301, #42 (Severe network failure) is specific for LTE RAT). Upon receiving the ATTACH Reject message and the error cause, in step 813, UE 801 starts a timer associated with PLMN #1. UE 801 is no longer allowed to attach to the same PLMN until the timer expires (e.g., see 814). In step 815, UE 801 selects another network PLMN #2 and tries to attach to PLMN #2 by sending an ATTACH Request to the network. Later, the timer associated with PLMN #1 expires, in step 816. In step 817, UE 801 is able to select PLMN #1 again. Similar to the second embodiment, the timer value may be determined by the network or by the UE. The timer value may also be dynamically adjusted based on predefined triggering events such as changed UE location. In some alternative examples, the UE receives the error cause from TAU REJECT message or SERVICE REJECT message when the UE tries Tracking Area Update Procedure or Service Procedure in the network. The UE behavior after receiving the error cause is similar to the steps illustrated in FIG. 8.

Figure 9:
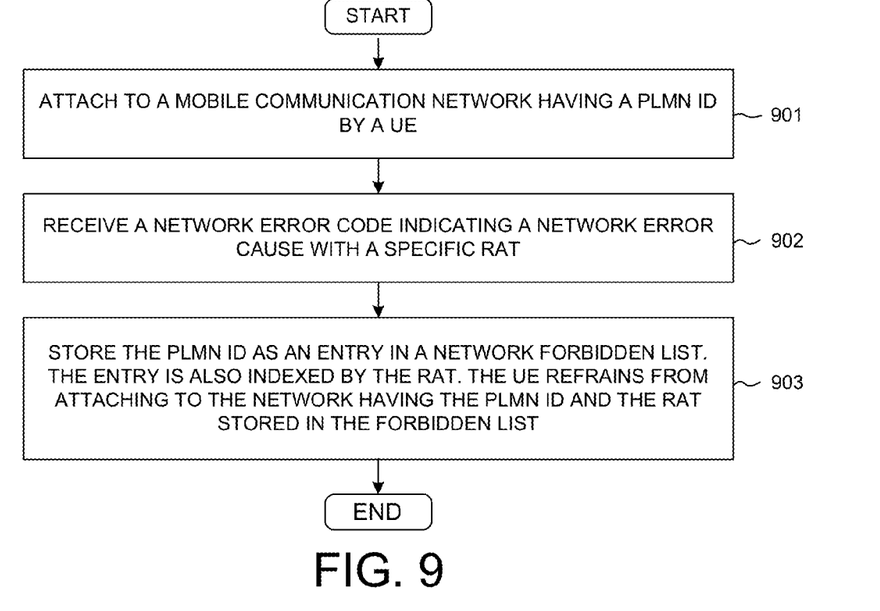
FIG. 9 is a flow chart of one embodiment of a method of applying a network forbidden list in accordance with one novel aspect.

FIG. 9 is a flow chart of one embodiment of a method of applying a network forbidden list in accordance with a novel aspect. In step 901, a UE tries to attach to a mobile communication network having a PLMN ID. In step 902, the UE receives an error code indicating a network error cause associated with a specific radio access technology (RAT). In step 903, the UE stores the PLMN ID as an entry in a network forbidden list. The entry is also indexed by the RAT. The UE refrains from attaching to any network having the same PLMN ID using the same RAT stored in the network forbidden list.

Figure 10:
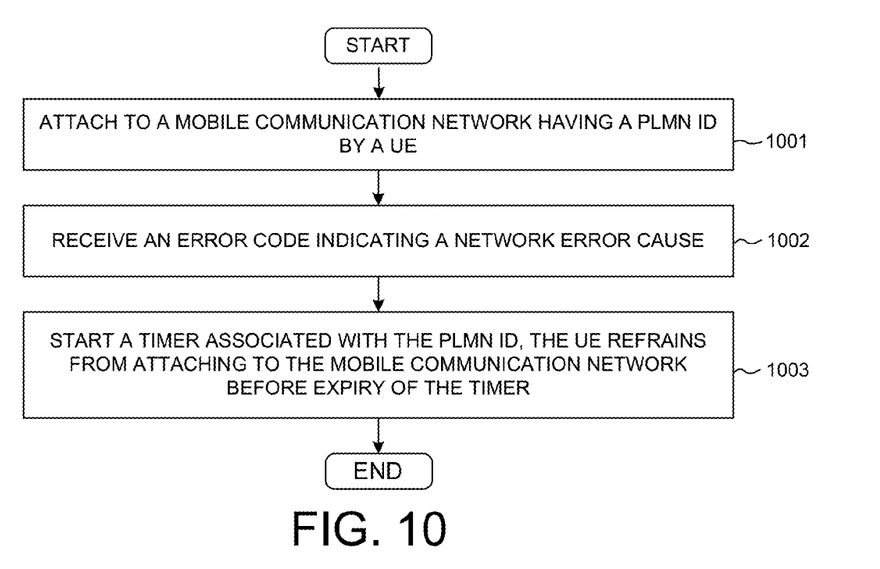
FIG. 10 is a flow chart of one embodiment of a method of timer-based network selection in accordance with one novel aspect.

FIG. 10 is a flow chart of one embodiment of a method of timer-based network selection in accordance with a novel aspect. In step 1001, a UE tries to attach to a mobile communication network having a PLMN ID. In step 1002, the UE receives an error code indicating a network error cause. In step 1003, the UE starts a timer having a timer value associated with the PLMN ID. The UE refrains from attaching to any network having the same PLMN ID before expiry of the timer. In one embodiment, the PLMN ID is stored as an entry in a network forbidden list. After expiry of the timer, the entry is then removed from the network forbidden list.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
attaching to a mobile communication network using a radio access technology (RAT) having a Public Land Mobile Network (PLMN) ID by a user equipment (UE);
receiving an error code that indicates a network error cause; and
storing the PLMN ID as an entry in a network forbidden list, wherein the entry also includes a radio access technology (RAT) associated with the network and the received error code, and wherein the UE refrains from attaching to the mobile communication network having the PLMN ID and the RAT stored in the forbidden list.

2. The method of claim 1, wherein the network error cause comprises a severe network failure.

3. The method of claim 1, wherein the network forbidden list is stored in a subscriber identity module (SIM) or internal memory of the UE.

4. The method of claim 1, wherein the network forbidden list has a maximum number of entry, and wherein an old entry is removed when a new entry is added cancelled upon reaching the maximum number of entry.

5. The method of claim 1, further comprising:
associating a timer value with the PLMN ID and RAT entry in the forbidden list;
starting a timer of the timer value associated with the entry, wherein the UE refrains from attaching to the mobile communication network before expiry of the timer.

6. A method, comprising:
attaching to a mobile communication network having a Public Land Mobile Network (PLMN) ID by a user equipment (UE);
receiving an error code that indicates a network error cause; and
starting a timer associated with the PLMN ID upon receiving the error code, wherein the UE refrains from attaching to the mobile communication network having the PLMN ID before expiry of the timer.

7. The method of claim 6, further comprising:
storing the PLMN ID as an entry in a network forbidden list upon receiving the error code.

8. The method of claim 7, further comprising:
removing the entry upon expiry of the timer.

9. The method of claim 6, wherein the timer value is determined by the UE based on the PLMN ID and the network error code.

10. The method of claim 6, wherein the timer value is retrieved from a subscriber identity module (SIM) or from internal memory of the UE.

11. The method of claim 6, wherein the timer value is derived from information retrieved from a subscriber identity module (SIM).

12. The method of claim 6, wherein the timer value is dynamically adjusted based on a predefined triggering condition detected by the UE.

13. The method of claim 12, wherein the triggering condition comprises a UE location or a changed network condition.

14. A user equipment (UE), comprising:
a network access module that attempts to attach to a mobile communication network having a Public Land Mobile Network (PLMN) ID;

a receiver that receives an error code that indicates a network error cause; and a timer having a timer value associated with the PLMN ID, wherein the timer is started upon receiving the error code, and wherein the UE refrains from attaching to the mobile communication network having the PLMN ID before expiry of the timer.

15. The UE of claim 14, wherein the network error cause comprises a severe network failure for a specific radio access technology (RAT).

16. The UE of claim 14, further comprising:
a configuration module that stores the PLMN ID as an entry in a network forbidden list.

17. The UE of claim 16, wherein the network forbidden list is stored in a subscriber identity module (SIM) or internal memory of the UE.

18. The UE of claim 14, wherein the UE derives the timer value from information retrieved from a subscriber identity module (SIM) or from internal memory of the UE.

19. The UE of claim 14, wherein the timer value is determined by the UE based on the PLMN ID and the network error code.

20. The UE of claim 14, wherein the timer value is dynamically adjusted based on a predefined triggering condition detected by the UE.

21. The UE of claim 20, wherein the triggering condition comprises a UE location or a changed network condition.

* * * * *